United States Patent

Strong et al.

Patent Number: 5,829,887
Date of Patent: Nov. 3, 1998

[54] DIMENSIONALLY-STABLE BALL FOR A BALL AND SOCKET BEARING ASSEMBLY

[76] Inventors: Jeffrey W. Strong, 207 Elsa Rd., Jupiter, Fla. 33477; John R. Newton, 485 Royal Palm Way, Boca Raton, Fla. 33432

[21] Appl. No.: 858,844

[22] Filed: May 19, 1997

Related U.S. Application Data

[63] Continuation-in-part of Ser. No. 856,743, May 16, 1998.
[51] Int. Cl.⁶ .................................................... F16C 23/04
[52] U.S. Cl. ............................................ 384/206; 384/208
[58] Field of Search .................................. 384/145–146, 384/203, 204, 206–214

[56] References Cited

U.S. PATENT DOCUMENTS 5,346,315  9/1994  Stong et al. ............................ 384/206

Primary Examiner—Lenard A. Footland
Attorney, Agent, or Firm—Michael Ebert

[57] ABSTRACT

A ball and socket assembly adapted to receive the rotatable shaft of a rudder installed in a boat. The assembly is composed of a journal box having a spheroidal cavity in which is socketed a ball-like bearing having an axial bore to accommodate the rudder shaft, the bearing being free to rotate within the cavity and thereby align itself with the rudder shaft as it deviates from the vertical as a result of forces imposed on the rudder. The ball-like bearing is formed by a cylindrical tube of UHMW polyethylene which is heated to an annealing temperature and thereby expanded to accept a fiber-reinforced resin sleeve which when the UHMW tube cools is compressed thereby. The resultant sleeve-lined tube is then machined to assume the ball-like shape of the bearing. Because the resin sleeve lining the machined bearing has a low coefficient of thermal expansion and the UHMW casing of the bearing, having been annealed, then also has a low coefficient of thermal expansion, the lined bearing through which the rudder shaft extends is dimensionally stable and therefore unaffected by marked changes in temperatures in the environment in which the assembly is installed.

8 Claims, 1 Drawing Sheet

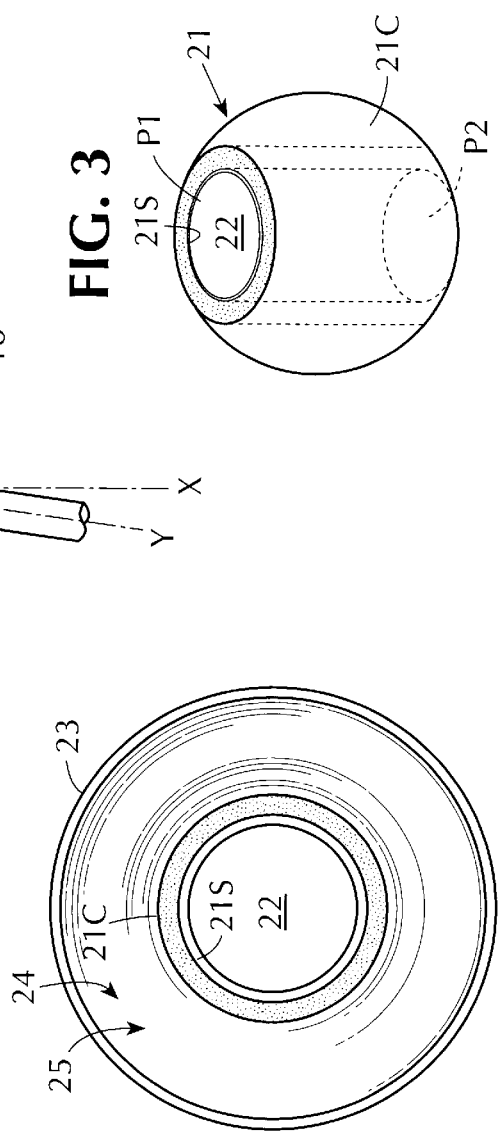
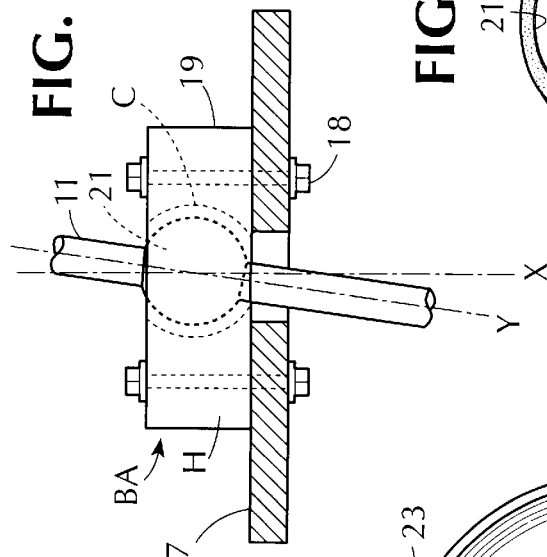
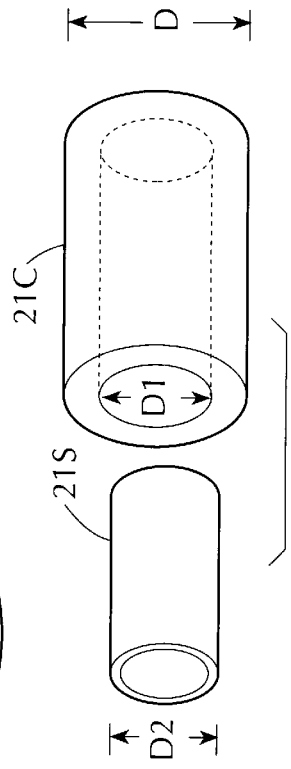
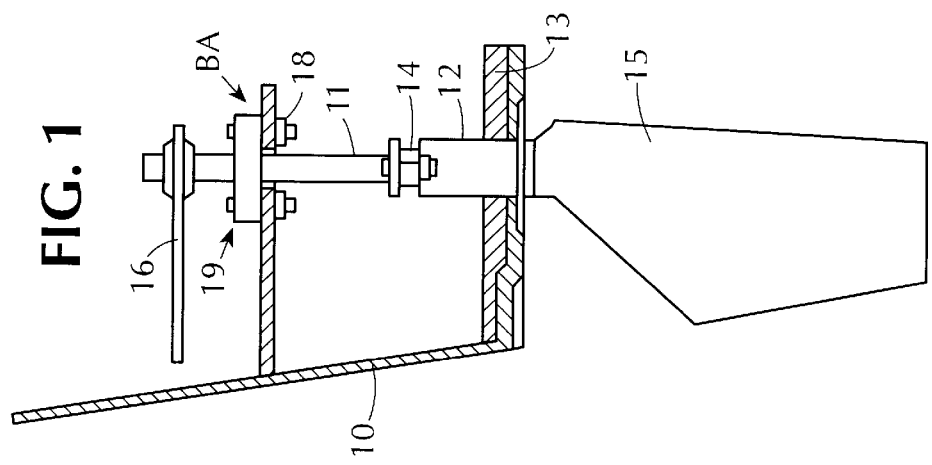

DIMENSIONALLY-STABLE BALL FOR A BALL AND SOCKET BEARING ASSEMBLY

RELATED APPLICATION

This application is a continuation-in-part of the Strong et al. copending application entitled SELF-ALIGNING BALL AND SOCKET BEARING ASSEMBLY, Ser. No. 08/856,743, filed May 16, 1998 the entire disclosure of which is incorporated herein by reference.

BACKGROUND OF INVENTION

1. Field of Invention

This invention relates generally to a ball and socket bearing assembly adapted to align itself with a vertical rudder shaft extending therethrough regardless of the degree to which the post deviates from the vertical as a result of hydrodynamic or other forces imposed on the rudder, and more particularly to an assembly of this type in which the ball-like bearing is dimensionally stable and unaffected by changes in temperature in the environment in which the assembly is installed, even when these changes lie within a broad range.

2. Status of Prior Art

A sailboat or a power boat is steered by a rudder in the form of a flat surfaced structure or blade hinged to the stern of the vessel and controlled by a helm. When the boat advances in a straight course, the rudder is then in line with the boat. But if the rudder is turned by the helm to one side or the other, it offers sufficient resistance to the water impinging on its surface to deflect the stern and thereby change the direction in which the boat advances.

In a typical sail or power boat installation, the rudder which is below the hull is joined to a rudder post which passes through a bronze or brass sleeve fastened to the hull, the post terminating in a lever or steering arm functioning as the helm. The metal sleeve is sealed by a packing gland affixed thereto to prevent water from entering the boat.

To maintain the rudder post in its proper upright position, a bearing assembly is provided that is supported on a horizontal plate or platform cantilevered from the stern at a position below the steering arm, the rudder post passing through this assembly. The bearing assembly is adapted to sustain the side loads to which the post is subjected as well as to prevent the rudder post from slipping down into the water.

In operation, exerted on the rudder are hydrodynamic forces whose direction depends on the orientation of the rudder relative to the water stream impinging on its surface. These forces which are transmitted to the rudder post, seek to laterally displace the post. The function of the bearing assembly through which the post passes is to resist these forces which are sometimes considerable, and thereby maintain the rudder post at its proper position.

Of greatest prior art interest is the Strong et al. U.S. Pat. No. 5,346,315. This patent discloses a ball and socket assembly adapted to engage the post or shaft of a rudder installed in the stern of a boat and to maintain it at a proper upright position regardless of the degree to which the post deviates from the vertical and is subjected to hydrodynamic forces which seek to displace the post.

The assembly consists of a journal box fixedly mounted on a support and having a spheroidal cavity, and a bearing socketed in the cavity through which the rudder post extends. The bearing which is formed of UHMW polyethylene includes a spheroidal or bulbous section that nests within the cavity of the box and a cylindrical section projecting from the box and pinned to the post whereby the bearing which is in alignment with the post and its spheroidal section, is free to rotate within the cavity of the journal box in accordance with the rotation of the post as the boat is steered.

One practical drawback to a ball and socket assembly of the type disclosed in the prior Strong et al. patent is that it is relatively expensive to fabricate. The reason for this is that the journal box consists of two plastic plates formed of the same UHMW polyethylene material as the bearing, the plastic plates having contoured indentations machined therein so that when put in superposed relation, they then define the spheroidal cavity in which the bearing is nested.

To put together the prior Strong et al. ball and socket bearing assembly, one must place the lower portion of the bulbous section of the UHMW bearing within the contoured indentations of the lower plate, and then place the upper plate over the lower plate so that the upper portion of the bearing lies with the contoured indentations of the upper plate. The superposed plastic plates are then riveted together to lock the bearing therein.

The manufacture of this prior assembly is time consuming and costly, requiring separate machining of the two plates forming the journal box, for the shape of the cavity in the journal box must properly match the shape of the bearing nested therein.

To overcome this practical drawback, there is disclosed in the above-identified Strong et al. copending patent application a ball and socket bearing assembly that consists of a molded journal box having a spheroidal cavity therein defining a socket in which is nested a pre-formed ball-like bearing formed of UHMW polyethylene or of a material having similar non-stick properties, the rudder post passing through an axial bore in the bearing.

The assembly is produced by placing the preformed bearing in a mold to create an annular space between the bearing and the inner wall of the mold. This space is then flooded with a curable liquid resin monomer whereby when the monomer is polymerized and rigidified, it does not bond to the non-stick bearing. The bearing is therefore free to rotate in the cavity and to align itself with the rudder post regardless of the degree to which the post deviates from the vertical as a result of hydrodynamic or other forces imposed on the rudder.

When a ball and socket bearing assembly for a rudder shaft or post of the type disclosed in the prior Strong et al. patent '315 and in the copending Strong et al. patent application is installed in a boat, it is then exposed to an environment whose air temperature is by no means constant. This ambient temperature may vary through a more or less broad range that depends on the geography of the environment. Thus in some cases, the ambient air temperature may be well below the freezing point, while in other cases it may exceed 90 degrees Fahrenheit.

An assembly of the type disclosed in our above-identified copending application includes a ball-like bearing machined entirely of UHMW polyethylene. This ultra-high molecular weight plastic has an exceptionally low coefficient of friction; hence it is an almost ideal material for the ball-like bearing which rotates within a cavity in the journal box, for little resistance is offered to this rotation.

However, UHMW polyethylene has a relatively high coefficient of thermal expansion. This property is exploited in the mold disclosed in the copending Strong et al. application for molding the ball and socket bearing assembly. By making the mold of UHMW material, and heating and expanding the mold after the assembly is molded therein, it then becomes possible to remove the molded assembly from the mold.

However, when the ball-like bearing in the assembly is machined of UHMW polyethylene material, the thermal expansion properties of this material may create operating problems. Thus if the environmental temperature to which the ball and socket bearing assembly is exposed is very high, the resultant expansion of the UHMW bearing may cause it to stick in the journal box cavity in which it is socketed. And the resultant expansion of the bore in the bearing may loosen the rudder post going through this bore. But if the environmental temperature is very frigid, the resultant contraction of the UHMW bearing gives rise to another set of problems.

Though one does not usually experience temperature extremes in a temperate climate, they are encountered in other climates. Hence an assembly in which the ball-like bearing is formed entirely of UHMW material having a relatively high coefficient of thermal expansion may not be suitable for all climactic conditions.

SUMMARY OF INVENTION

In view of the foregoing the main object of this invention is to provide an improved self-aligning ball and socket bearing assembly adapted to receive a rudder post, or shaft, or any other rotatable element, in which the ball-like bearing of the assembly is dimensionally stable and substantially insensitive to marked changes in ambient temperature.

More particularly, an object of this invention is to provide an assembly of the above type in which the ball-like bearing has a casing formed of UHMW polyethylene material and a liner therein formed of a fiber-reinforced resin sleeve.

Also an object of the invention is to provide a method for fabricating a bearing having a UHMW polyethylene casing and a sleeve formed of a fiber-reinforced resin lining the casing.

Briefly stated, these objects are attained by a ball and socket assembly adapted to receive the rotatable shaft of a rudder installed in a boat. The assembly is composed of a journal box having a spheroidal cavity in which is socketed a ball-like bearing having an axial bore to accommodate the rudder shaft, the bearing being free to rotate within the cavity and thereby align itself with the rudder shaft as it deviates from the vertical as a result of forces imposed on the rudder.

The ball-like bearing is formed by a cylindrical tube of UHMW polyethylene which is heated to an annealing temperature and thereby expanded to accept a fiber-reinforced resin sleeve which when the UHMW tube cools is compressed thereby. The resultant sleeve-lined tube is then machined to assume the ball-like shape of the bearing. Because the resin sleeve lining the machined bearing has a low coefficient of thermal expansion and the UHMW casing of the bearing, having been annealed, then also has a low coefficient of thermal expansion, the lined bearing through which the rudder shaft extends is dimensionally stable and therefore unaffected by marked changes in temperatures in the environment in which the assembly is installed.

BRIEF DESCRIPTION OF DRAWINGS

For a better understanding of the invention as well as other objects and further features thereof, reference is made to the following detailed description to be read in conjunction with the accompanying drawings, wherein:

FIG. 1 illustrates a rudder installed in the stern of a boat in which the rudder post passes through a ball and socket bearing assembly in accordance with the invention;

FIG. 2 illustrates the relationship of the rudder post and the bearing through which it passes when the axis of the post deviates from the vertical;

FIG. 3 is a separate view of the bearing component of the assembly;

FIG. 4 illustrates the method by which a ball-like bearing for the assembly is fabricated; and FIG. 5 illustrates the mold in which the journal box component of the assembly is molded.

DESCRIPTION OF INVENTION

The Bearing Assembly

Referring now to FIGS. 1 and 2 there is shown the stern 10 of a boat having installed therein a rudder post 11 whose lower end passes through a brass or bronze sleeve 12 fastened to the hull 13 of the boat. Post 11 is joined to a rudder 15 disposed below the hull. Attached to metal sleeve 12 is a packing gland 14 which prevents water from leaking into the boat.

Coupled to the upper end of the upright rudder post 11 is a steering arm or lever 16 which makes it possible for a pilot to steer the boat. Ruder post 11 passes through an opening in a horizontal plate or platform 17 that is below the steering arm and is cantilevered from stern 10. The platform is made of wood, fiberglass-reinforced plastic or other high strength material. Mounted on platform 17 by bolts 18 is a ball and socket bearing assembly BA in accordance with the invention through which rudder post 11 extends. Thus the rudder post is maintained in its upright position by sleeve 12 engaging the lower end of the post and by the bearing assembly BA adjacent its upper end. As shown separately in FIG. 2, the ball and socket assembly BA includes a molded plastic journal box 19 provided with bore holes H to receive mounting bolts 18.

Journal box 19 has a cavity C therein in which is socketed a ball-like bearing 21 in the form of a sphere as shown in FIG. 3 having truncated poles $P_1$ and $P_2$ and an the axial bore 22 extending between the poles. Bore 22 has a diameter substantially matching the diameter of rudder post 11 received within this bore.

Bearing 21 is formed of an outer casing 21C fabricated of UHMW, an ultra-high molecular weight polyethylene whose coefficient of friction is almost as low as that of TEFLON (tetrafluoroethylene). UHMW possesses non-stick properties, such that when journal box 19 is molded about the bearing with a curable resin and the resin polymerizes and becomes rigid, cavity C is then created in the journal box that conforms to the shape of bearing 21 but is not bonded to the bearing. Hence the low-friction bearing is then rotatable within the cavity which sockets the bearing.

UHMW outer casing 21C of the bearing is lined with a fiber-reinforced resin sleeve 21C whose internal diameter defines the axial bore 22 of the bearing. Rudder post 11 is pinned to bearing 21 so that when the rudder post is rotated, bearing 21 pinned thereto then rotates within cavity C of the journal box.

Bearing 21 is dimensionally stable and the manner in which the bearing is fabricated and the properties of the resultant bearing will later be set forth in the next section of the specification.

In an assembly in accordance with the invention, the bearing 21 whose angular orientation with respect to the cavity C of the journal box 19 is adjustable, aligns itself with rudder post 11, regardless of the degree to which the post deviates from the vertical axis X. Thus, as shown in FIG. 2, the axis Y of rudder post 11 is inclined with respect to vertical axis X, bearing 21 being aligned with the rudder post.

The danger exists that steering arm 16 coupled to rudder post 11 may become loose, as a consequence of which the rudder post which passes through bearing assembly BA, and sleeve 12 may then be free to slip down into the water, with a resultant loss of the rudder. To prevent the rudder post 11 from slipping down, a collar (not shown) is attached by set screws to rudder post 11. This collar prevents axial displacement of the post in the downward direction without, however, interfering with rotation of the post.

As pointed out in the background section, rudder 15 is subjected to hydrodynamic forces which are transferred to rudder post 11. When these forces are considerable, they seek to laterally displace the rudder post from its proper position. Because the post is pinned to bearing 21, these forces are transmitted to bearing 21 which is nested within cavity C of the journal box 19 affixed to platform 17. The journal box therefore acts to absorb these forces to prevent tilting or displacement of rudder post 11.

Fabricating of Bearing

A ball and socket bearing assembly for the rotatable shaft of a boat rudder is exposed to an environment whose ambient air temperature is by no means constant, for this temperature may undergoes marked changes. Thus on some occasions the air temperature may be extremely frigid, well below the freezing point, while on other occasions the air temperature may be elevated well above 70 degrees Fahrenheit.

UHMW polyethylene has a relatively high coefficient of thermal expansion; hence when subjected to frigid temperatures it contracts measurably, and when subjected to elevated temperatures, it then expands to a significant degree that depends on the temperature.

A ball-like bearing machined of UHMW polyethylene, as disclosed in on above-identified copending application, though it has desirable low-friction characteristics, may be troublesome when the bearing assembly is exposed to extremes of environmental temperatures. Thus under very hot temperature conditions, the UHMW bearing may expand within the cavity in which the ball-like bearing is socketed so as to stick within the cavity and thereby resist rotation of the bearing within the cavity.

And with environmental temperatures that are extremely low, the resultant contraction of the UHMW bearing may unduly looses the bearing within the cavity of the journal box.

It is desirable therefore that the assembly include a ball-like bearing that is substantially insensitive to marked changes in environmental temperatures so that it is dimensionally stable. To this end, bearing 21 shown in FIG. 3 has a UHMW outer casing 21C which is annealed, as a consequence if which it has a relatively low coefficient of thermal expansion. The casing is lined with a fiber-reinforced resin sleeve 21S whose coefficient of thermal expansion is also low. Sleeve 21S is preferably formed of a fiberglass-reinforced polymer.

The manner in which this dimensionally-stable sleeve-lined ball-like bearing 21 is fabricated will now be described.

To form the UHMW outer casing 21C, use is made of a cylinder of this material whose outer diameter D at room temperature matches the diameter of the ball-like bearing, as shown in FIG. 4. This UHMW cylinder then is heated to an elevated annealing temperature which causes it to expand, the expanded cylinder then having an inner diameter $D_1$.

Inserted into heated UHMW cylinder 21C is the fiber-reinforced resin sleeve 21S which at room temperature has an outer diameter $D_2$ that substantially matches inner diameter $D_1$ of the UHMW cylinder. Hence the sleeve fits neatly into the thermally-expanded cylinder.

When UHMW cylinder 21C cools to a room temperature level and contracts, it then subjects sleeve 21C inserted therein to compression and maintains the sleeve under compression throughout the range of temperatures to which the bearing is exposed. The sleeve-lined cylinder 21C is then machined to assume the form of the baring shown in FIG. 3.

While UHMW material normally has a relatively high thermal coefficient of thermal expansion, when this material is annealed by heating and cooling it, the resultant changes in molecular orientation brings about a change in the coefficient of thermal expansion, so that the annealed UHMW material then has a relatively low coefficient of expansion.

Since the fiber-reinforced resin forming the sleeve 21S has a relatively low coefficient of thermal expansion, as does the annealed UHMW casing 21C, the resultant bearing is substantially insensitive to temperature changes and is stable dimensionally. The fact that sleeve 21S through which the rudder post extends is made of a fiber-reinforced resin which does not have a low-coefficient of sliding friction is not a disadvantage, for the rudder post is pinned to the bearing and is not intended to rotate within the bearing.

Molding Technique

The manner in which journal box 19 is molded about ball-like bearing 21 will now be described in connection with FIG. 5.

Use is made of a cylindrical mold 23 for forming a cylindrical fiberglass-reinforced resin journal box of high strength having a cavity therein which exactly conforms to the configuration of the bearing nested therein. The resin may be a polyester, a vinyl ester or an epoxy. The resin is reinforced by fibers such as fiberglass, graphite fibers or Kelvar to provide a journal box of high structural strength resistant to whatever forces the installed assembly is subjected.

Preformed bearing 21 having a UHMW casing lined by a fiber-reinforced resin sleeve is placed in the center of mold 23 whose diameter is greater than that of the ball-like bearing to provide an annular space 24 between the inner wall of the mold and the surface of the bearing. The inner wall of the mold is lined with fiberglass matting and fiberglass roving 25 is also placed within the annular space. Annular space 24 is then flooded with an uncured liquid monomer of the resin, using for this purpose vacuum-assisted resin injection. The mold is then closed.

When the resin in the closed mold is fully polymerized and forms a solid body, then within the mold is a ball and socket bearing assembly in accordance with the invention in which the ball-like preformed bearing is socketed in the cavity formed in the journal box. And while the bank of the cavity conforms exactly to the contours of the baring, it is not bonded thereto, for the bearing is fabricated of non-stick UHMW polymeric material.

Mold 23 is preferably formed of non-stick plastic material, such as UHMW polyethylene, hence the journal box molded therein is not bonded to the inner surface of the mold. And because UHMW material has a high thermal coefficient of expansion, by heating and expanding the mold, it then separates from the assembly and it becomes possible to remove the bearing assembly from the mold without difficulty.

After the bearing assembly is removed from the heated mold, the UHMW mold then cools and reverts to its original machined dimensions, and the mold is now in condition for reuse. Thus no need exists for a two part mold or for a tapered mold. In practice, however, other mold materials may be used, such as aluminum. And with a UHMW mold there is no need for a release agent. The molded journal box is finished inside and out, and no flashing need be removed.

While there have been shown a preferred embodiment of a dimensionally-stable ball for a ball and socket bearing assembly in accordance with the invention, it will be appreciated that many changes may be made therein without departing from the spirit of the invention.

We claim:

1. A self-aligning ball and socket bearing assembly adapted to receive a rotatable shaft or post extending along a nominal axis; said assembly comprising:
   A. a preformed bearing provided with a bulbous section and a bore extending axially therethrough having a diameter substantially matching that of the post, said bearing being fabricated of an outer casing formed of UHMW polyethylene possessing non-stick properties, and a sleeve formed of fiber reinforced resin lining the casing to define said bore; and
   B. a single-piece journal box molded of resin about the bulbous section of the bearing to define a cavity conforming to the section but not bonded thereto, whereby the bearing is socketed in the journal box and is rotatable therein to align the bearing with the post regardless of the degree to which the post deviates from the nominal axis.

2. An assembly as set forth in claim 1, in which the bearing has the shape of a sphere whose upper and lower poles are truncated, said bore extending between the poles.

3. An assembly as set forth in claim 2, in which the bearing has a cylindrical extension above said upper pole encircling the post, and means to pin the extension to said post whereby rotation of the post causes the bearing to rotate within the cavity.

4. An assembly as set forth in claim 1, in which the journal box is molded of a fiberglass-reinforced resin.

5. An assembly as set forth in claim 4, in which the resin is a vinyl ester.

6. An assembly as set forth in claim 1, in which the sleeve has a relatively low coefficient of thermal expansion and said UHMW casing is annealed to cause it to have a similar low coefficient of thermal expansion whereby the bearing is substantially insensitive to marked changes in environmental temperatures.

7. A bearing as set forth in claim 1, in which the resin is a fiberglass-reinforced polymer.

8. A bearing comprising:
   A. a hollow casing having a ball-like outer shape and a cylindrical inner wall, said casing being made of UHMW polyethylene which is annealed to impart thereto a relatively low coefficient of thermal expansion; and
   B. a fiber-reinforced resin lining the wall of the casing to define a bore for receiving a post or shaft to be supported in the bearing.

* * * * *